United States Patent
Chihara

(10) Patent No.: US 7,514,883 B2
(45) Date of Patent: Apr. 7, 2009

(54) ILLUMINATING DEVICE FOR IMAGING APPARATUS

(75) Inventor: Eiji Chihara, Tochigi (JP)

(73) Assignee: Sony Corporation, Tokyo (JP)

( * ) Notice: Subject to any disclaimer, the term of this patent is extended or adjusted under 35 U.S.C. 154(b) by 243 days.

(21) Appl. No.: 11/704,448

(22) Filed: Feb. 9, 2007

(65) Prior Publication Data

US 2007/0189030 A1 Aug. 16, 2007

(30) Foreign Application Priority Data

Feb. 13, 2006 (JP) ............................. 2006-034910

(51) Int. Cl.
*G05F 1/00* (2006.01)
(52) U.S. Cl. .................. 315/307; 315/119; 315/224; 315/209 R; 362/552
(58) Field of Classification Search ............. 315/119, 315/120, 123, 127, 128, 160, 170, 172, 209 R, 315/224, 225, 291, 299–301, 306, 307, 362; 362/551, 552, 559, 557, 157

See application file for complete search history.

(56) References Cited

U.S. PATENT DOCUMENTS 6,577,136 B1 * 6/2003 Marques .................. 324/426

2002/0109465 A1 * 8/2002 Miyoshi .................. 315/291

FOREIGN PATENT DOCUMENTS

JP 11 237661 8/1999

* cited by examiner

*Primary Examiner*—Douglas W Owens
*Assistant Examiner*—Jianzi Chen
(74) *Attorney, Agent, or Firm*—Frommer Lawrence & Haug LLP; William S. Frommer

(57) ABSTRACT

An illuminating device for imaging apparatus includes: a light source; plural batteries that supply power to the light source; plural detection voltage generating units that are provided with respect to each battery and generate detection voltages from output voltages of the batteries; a voltage monitoring unit that is supplied with the plural detection voltages, respectively, and determines whether the output voltages of the batteries are equal to or less than a predetermined specified value or not with respect to each battery; and a control unit that turns on/off the supply of the power to the light source based on a determination result of the voltage monitoring unit, wherein detection switches that turn on/off the supply of the detection voltages from the respective detection voltage generating units to the voltage monitoring unit based on the control by the control unit are provided with respect to each battery.

12 Claims, 4 Drawing Sheets

ILLUMINATING DEVICE FOR IMAGING APPARATUS

CROSS REFERENCES TO RELATED APPLICATIONS

The present invention contains subject matter related to Japanese Patent Application JP 2006-034910 filed in the Japanese Patent Office on Feb. 13, 2006, the entire contents of which being incorporated herein by reference.

BACKGROUND OF THE INVENTION

1. Field of the Invention

The present invention relates to an illuminating device for imaging apparatus.

2. Background Art

There are illuminating devices such as a video light mounted on an imaging apparatus such as a video camera for irradiating a subject with imaging auxiliary light (see JP-A-11-237661 (patent document 1)).

As such an illuminating device, there is provided an illuminating device that operates without power supply from the imaging apparatus but with a battery mounted in the device itself as power supply independent from the electronic equipment.

By the way, when current is allowed to flow in a condition in which the output voltage thereof is equal to or less than a predetermined specified value, over discharge occurs in the battery and the performance is deteriorated due to leak or the like. Accordingly, a function of monitoring the output voltage of the battery and stopping the power supply from the battery to the light source when the output voltage becomes equal to or less than the specified value is provided in the illuminating device.

In order to realize the function, a detection voltage generating unit that generates a detection voltage from the output voltage of the battery and a voltage monitoring unit that monitors the detection voltage generated by the detection voltage generating unit are provided in the illuminating device, and thereby, when the voltage monitoring unit determines that the output voltage of the battery is equal to or less than the specified value, the power supply from the battery to the light source is turned off.

SUMMARY OF THE INVENTION

However, in a condition in which no power is supplied to the light source of the illuminating device, when an input terminal (input port) of the voltage monitoring unit, to which the detection voltage from the detection voltage generating unit is supplied, is at "L" level, minute consumption current, so-called dark current is generated though the illuminating device is not operating (the light source is off).

If such dark current is left generated, there is concern that not only the power of the battery is wasted but also the battery is in the over discharge condition, and therefore, the battery is deteriorated.

In view of the above circumferences, it is desirable to provide an illuminating device for imaging apparatus that is advantageous for preventing generation of dark current.

According to an embodiment of the present invention, there is provided an illuminating device for imaging apparatus including: a light source; plural batteries that supply power to the light source; plural detection voltage generating units that are provided with respect to each battery and generate detection voltages from output voltages of the batteries; a voltage monitoring unit that is supplied with the plural detection voltages, respectively, and determines whether the output voltages of the batteries are equal to or less than a predetermined specified value or not with respect to each battery; and a control unit that turns on/off the supply of the power to the light source based on a determination result of the voltage monitoring unit, wherein detection switches that turn on/off the supply of the detection voltages from the respective detection voltage generating units to the voltage monitoring unit based on the control by the control unit are provided with respect to each battery.

According to an embodiment of the present invention, since the detection switches that turn on/off the supply of the detection voltages from the respective voltage detecting units to the voltage monitoring unit are provided with respect to each battery, the generation of dark current flowing from the respective batteries via the respective voltage detecting units can be reliably prevented by turning off the respective detection switches, and that is advantageous for the reduction in power consumption and the prevention of battery deterioration.

DESCRIPTION OF PREFERRED INVENTION

First Embodiment

Next, the first embodiment of the present invention will be described with reference to the drawings.

Figure 1:
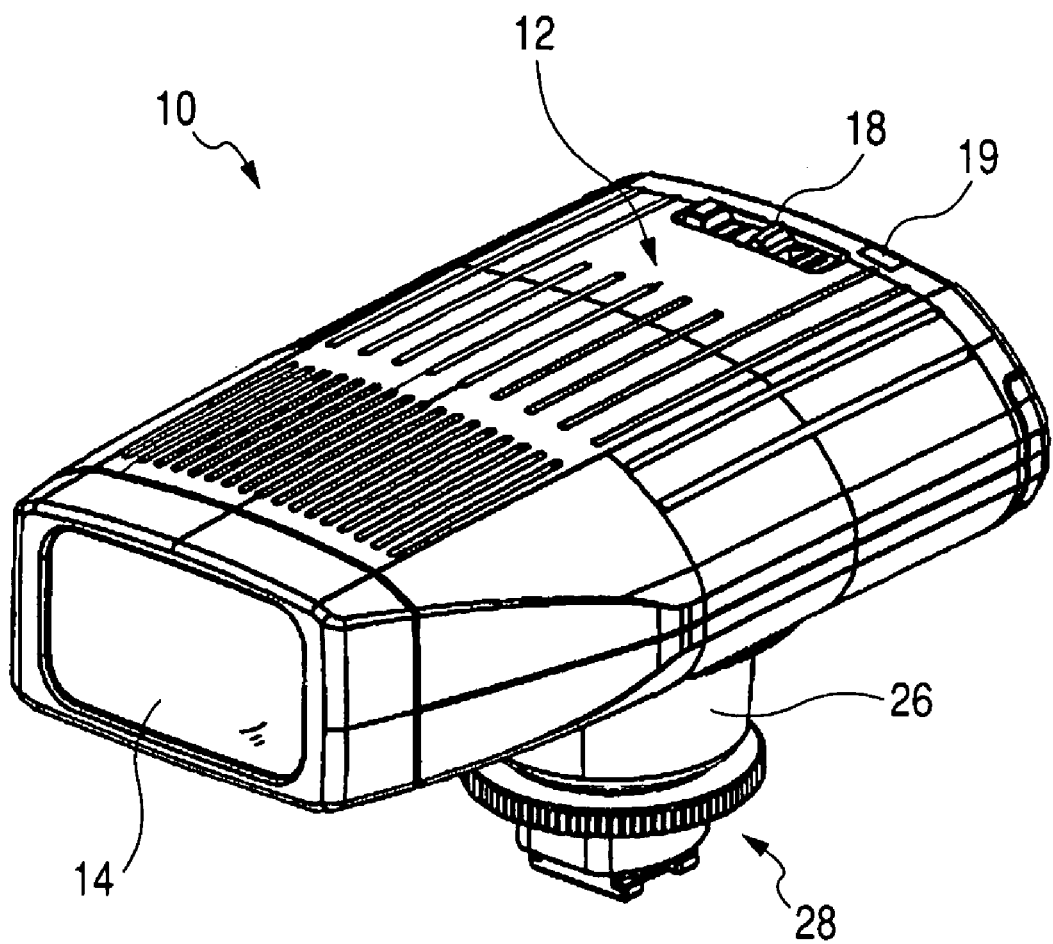
FIG. 1 is a perspective view of an illuminating device 10 according to a first embodiment.
Figure 2:
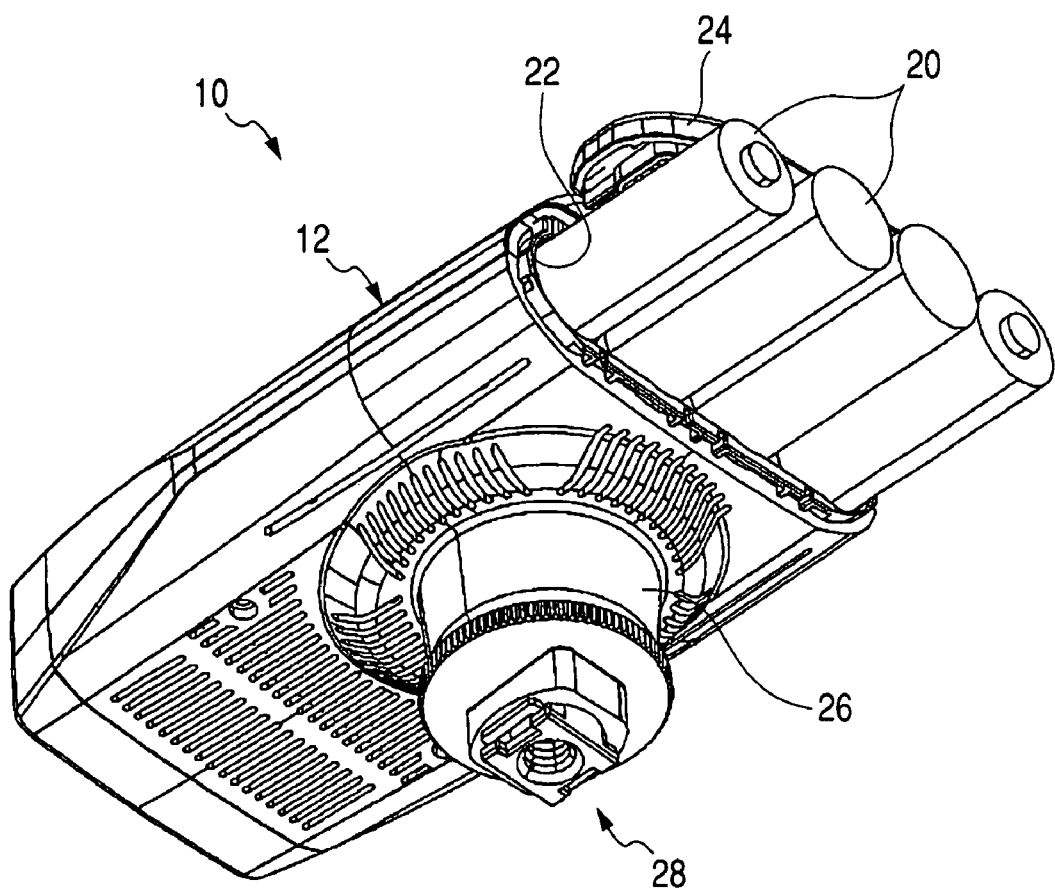
FIG. 2 is a perspective view of the illuminating device 10 according to the first embodiment.
Figure 3:
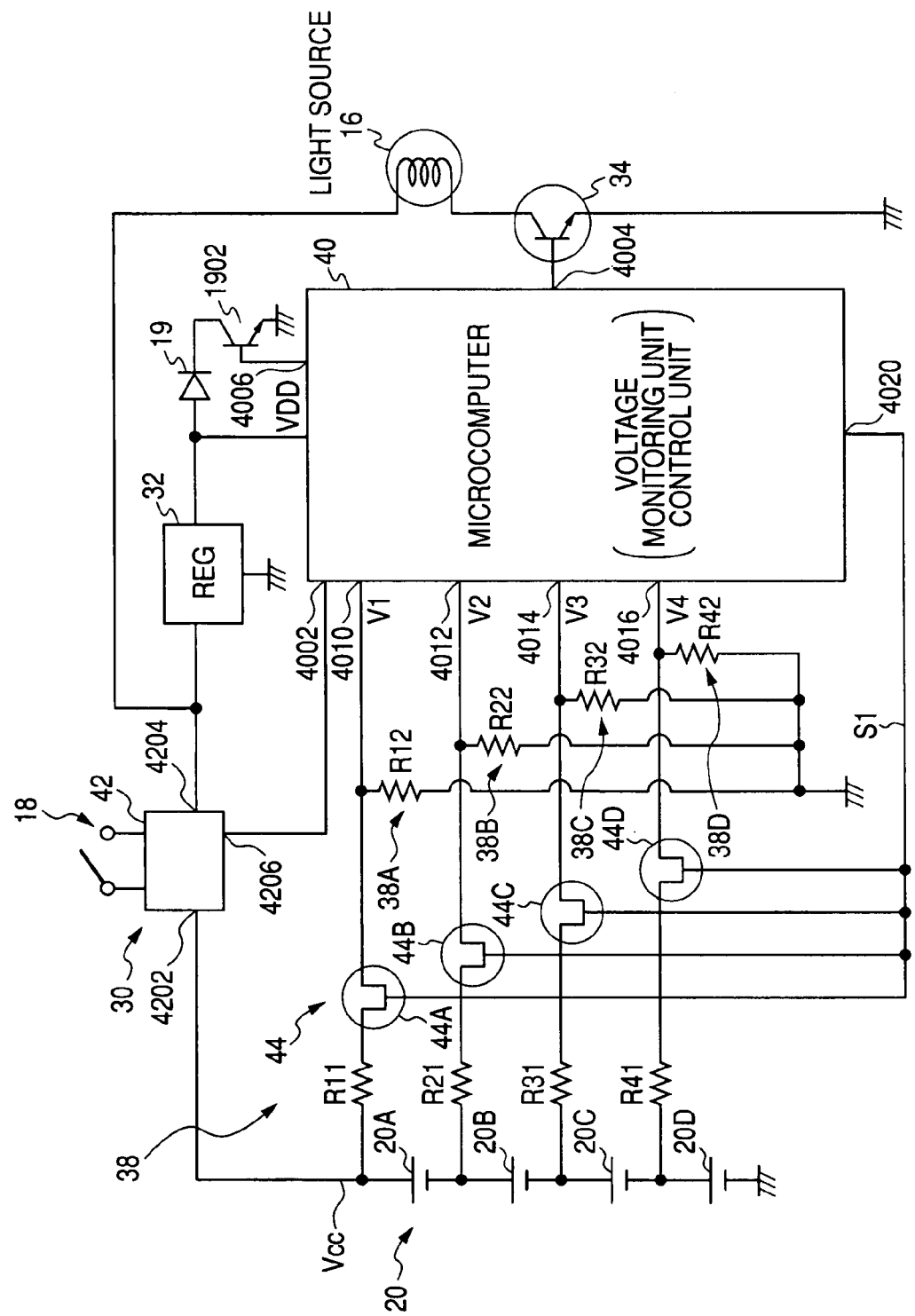
FIG. 3 is a circuit diagram showing a constitution of a control system of an illuminating device 10.

FIGS. 1 and 2 are perspective views of an illuminating device 10 according to the first embodiment, and FIG. 3 is a circuit diagram showing a constitution of a control system of the illuminating device 10.

As shown in FIGS. 1 and 2, the illuminating device 10 is a video light mounted on an imaging apparatus such as a video camera to irradiate a subject with light, and configured to operate without power supply from the imaging apparatus.

The illuminating device 10 has a case 12 forming an exterior thereof, and the case 12 has an anteroposterior length, a horizontal width shorter than the length, and a vertical height shorter than the width.

An opening is provided on the front end of the case 12, a transparent plate 14 is fitted in the opening, and a light source 16 (see FIG. 3) of an electric bulb is located facing the transparent plate 14 within the case 12. When the light source 16 is turned on, the light from the light source 16 is emitted ahead of the case 12 via the transparent plate 14.

An operation switch 18 for on/off operation of the light source 16 is provided on the upper wall near the rear side of the case 12, and an alarm lamp 19 is provided on the rear end of the upper wall of the case 12.

A cylindrical wall 26 projecting downwards is provided on the lower surface of the case 12, and a mounting part 28 to be mounted in an accessory mount part (accessory shoe) of the imaging apparatus is incorporated into the cylindrical wall 26.

A battery container 22 for containing plural batteries 20 that supply power to the light source 16 is provided in the rear part of the light source 16, and an opening and closing lid 24 that opens and closes the battery container 22 is formed on the rear end of the case 12.

In the embodiment, four AA nickel-hydride batteries with high capacity capable of outputting high current are used as the batteries 20.

The nickel-hydride battery is a secondary cell that is rechargeable for repeated use. When current is continuously output in a condition in which the output voltage thereof is below a predetermined specified value, over discharge occurs and the performance is deteriorated due to leak or the like.

Although the nickel-hydride batteries are used as the batteries 20 in the embodiment, for example, alkaline batteries with low capacity or primary cells such as manganese batteries may be used when the power consumption of the light source 16 is low. Further, regardless of the type of batteries, when current is continuously output in a condition in which the output voltage of a battery is below a predetermined specified value, over discharge occurs and the performance is deteriorated due to leak or the like.

Next, the constitution of the control system of the illuminating device 10 will be described.

As shown in FIG. 3, the illuminating device 10 includes a power supply switch unit 30, a regulator 32, a semiconductor switch 34, detection voltage generating units 38, a microcomputer 40, detection switches 44, etc.

These power supply switch unit 30, regulator 32, semiconductor switch 34, detection voltage generating unit 38, microcomputer 40, and detection switch 44 are provided on a board (not shown), and the board is accommodated within the case 12.

In the embodiment, the four batteries 20 contained in the battery container 22 are connected in series, and the output voltage output by the four batteries 20 is referred to as Vcc.

As below, for convenience of explanation, the battery 20 connected to a power supply line (Vcc) is referred to as a first battery 20A, the battery 20 connected to the first battery 20A as a second battery 20B, the battery 20 connected to the second battery 20B as a third battery 20C, and the battery 20 connected between the third battery 20C and ground (GND) as a fourth battery 20D.

The power supply switch unit 30 includes the operation switch 18 and a switch circuit 42.

The switch circuit 42 includes a power supply input terminal 4202, a power supply output terminal 4204, and a control signal input terminal 4206.

The switch circuit 42 is configured to switch and perform the on-operation of outputting from the power supply output terminal 4204 the power supply Vcc to be input to the power supply input terminal 4202 and the off-operation of turning off the output of the power supply Vcc according to both the on/off operation of the operation switch 18 and the control signal input to the control signal input terminal 4206.

As such a switch circuit 42, heretofore known various circuits using transistors, for example, may be adopted.

When the operation switch 18 is turned on, the switch circuit 42 performs on-operation, and, when the operation switch 18 is turned off, the switch circuit 42 performs off-operation. Further, when an inactive ("L" level) control signal is input from an output port 4002 of the microcomputer 40 to the control signal input terminal 4206, the switch circuit 42 performs off-operation.

The regulator 32 transforms the power supply Vcc supplied from the power supply output terminal 4204 of the power supply switch unit 30 to a constant voltage (constant current) of power supply VDD and supplies the voltage to the microcomputer 40.

The light source 16 is connected to the power supply output terminal 4204 of the power supply switch unit 30 and supplied with the power supply Vcc.

The semiconductor switch 34 is connected between the light source 16 and the ground, and is turned on when the control signal supplied from an output port 4004 of the microcomputer 40 is active ("H" level) and turned off when the control signal is inactive ("L" level). The on/off operation turns on/off of the supply to the light source 16 of the power supply Vcc.

The alarm lamp 19 includes an LED, and turned on and off according to the current supply by a drive transistor 1902. The drive transistor 1902 is turned on when the control signal supplied from an output port 4006 of the microcomputer 40 is active ("H" level) and turned off when the control signal is inactive ("L" level).

Four detection voltage generating units 38 are provided correspondingly to the first to fourth batteries 20A to 20D, and the four detection voltage generating units 38 will be described by referring to them as the first to fourth detection voltage generating units 38A to 38D.

The first detection voltage generating unit 38A includes first and second resistances R11 and R12 that divide the voltage appearing on the positive terminal of the first battery 20A between the voltage and the ground level. The first detection voltage V1 divided by the first detection voltage generating unit 38A is supplied to an input port 4010 of the microcomputer 40.

The second detection voltage generating unit 38B includes first and second resistances R21 and R22 that divide the voltage appearing on the positive terminal of the second battery 20B between the voltage and the ground level. The second detection voltage V2 divided by the second detection voltage generating unit 38B is supplied to an input port 4012 of the microcomputer 40.

The third detection voltage generating unit 38C includes first and second resistances R31 and R32 that divide the voltage appearing on the positive terminal of the third battery 20C between the voltage and the ground level. The third detection voltage V3 divided by the third detection voltage generating unit 38C is supplied to an input port 4014 of the microcomputer 40.

The fourth detection voltage generating unit 38D includes first and second resistances R41 and R42 that divide the voltage appearing on the positive terminal of the fourth battery 20D between the voltage and the ground level. The fourth detection voltage V4 divided by the fourth detection voltage generating unit 38D is supplied to an input port 4016 of the microcomputer 40.

The detection switches 44 are provided correspondingly to the first to fourth batteries 20A to 20D, respectively.

In the embodiment, the respective detection switches 44 will be described by referring to them as the first to fourth detection switches 44A to 44D corresponding to the first to fourth batteries 20A to 20D.

The first detection switch 44A is provided between the first resistance R11 and the second resistance R12.

The second detection switch 44B is provided between the first resistance R21 and the second resistance R22.

The third detection switch 44C is provided between the first resistance R31 and the second resistance R32.

The fourth detection switch 44D is provided between the first resistance R41 and the second resistance R42.

That is, each detection switch is provided between the first resistance and the second resistance. In other words, one end of the first resistance is connected to the output terminal of the battery 20, the other end of the first resistance is connected to one end of the detection switch 44, the other end of the detection switch 44 is connected to one end of the second resistance, and the other end of the second resistance is connected to the ground.

The control signal S1 that on/off controls the first to fourth detection switches 44A to 44D is the same signal and the signal is supplied from an output port 4020 of the microcomputer 40 to the first to fourth detection switches 44A to 44D.

In the embodiment, the first to fourth detection switches 44A to 44D include semiconductor switches. As the semiconductor switches, for example, FETs may be adopted.

Accordingly, the control signal S1 supplied to the first to fourth detection switches 44A to 44D becomes active ("H" level), all of the first to fourth detection switches 44A to 44D are brought into conduction and the first to fourth detection signals V1 to V4 are supplied to the input ports 4010, 4012, 4014, and 4016.

Further, the control signal S1 supplied to the first to fourth detection switches 44A to 44D becomes inactive ("L" level), all of the first to fourth detection switches 44A to 44D are brought out of conduction and the output voltages of the respective batteries 20 are shut by the detection switches 44.

That is, the first to fourth detection signals V1 to V4 are not generated by the first to fourth detection voltage generating units 38A to 38D, and thereby, the supply of the first to fourth detection signals V1 to V4 to the input ports 4010, 4012, 4014, and 4016 are stopped.

Therefore, even if the input ports 4010, 4012, 4014, and 4016 are inactive ("L" level), current flowing into the input ports is zero.

In the embodiment, since the circuits from the respective batteries 20 via the first to fourth detection voltage generating units 38A to 38D to the ground are shut when all of the first to fourth detection switches 44A to 44D are brought out of conduction, all current flowing from the respective batteries 20 via the first to fourth detection voltage generating units 38A to 38D to the ground is also zero.

The first to fourth detection signals V1 to V4 input to the input ports 4010, 4012, 4014, and 4016 of the microcomputer 40 are converted from analog signals to digital signals by an A/D converter within the microcomputer 40 and read.

The microcomputer 40 obtains the output voltages of the respective first to fourth batteries 20A to 20D by performing arithmetic processing on the digitally converted first to fourth detection signals V1 to V4, and determines whether the respective output voltages are equal to or less than a predetermined specified value or not.

When the supply of the power supply VDD to the microcomputer 40 is stopped, the outputs of the input ports 4010, 4012, 4014, and 4016 are not constant. When the outputs of the input ports become inactive ("L" level), current is allowed to flow through the input ports. When current flows through (into or out of) the input ports, current consumption (power consumption) is generated.

Further, in the embodiment, the microcomputer 40 determines whether the output voltages of the respective first to fourth batteries 20A to 20D are equal to or less than a predetermined specified value of the battery 20 or not, and, when any of the output voltages is equal to or less than a predetermined specified value of the battery 20, the control signal S1 to be supplied to the first to fourth detection switches 44A to 44D is made inactive ("L" level), and the supply of the first to fourth detection signals V1 to V4 to the microcomputer 40 is turned off.

Therefore, in the embodiment, the voltage monitoring unit that is supplied with plural detection voltages, respectively, and determines whether the output voltage of the battery 20 is equal to or less than a predetermined specified value of the battery 20 or not with respect to each battery 20 is configured by the microcomputer 40, and the control unit that turns on/off the supply of the power supply Vcc to the light source 16 based on the determination result of the output voltage monitoring unit is configured by the microcomputer 40.

The voltage monitoring unit and the control unit is not necessarily configured by the microcomputer 40, and, needless to add, maybe configured by heretofore known various circuits.

Further, in the embodiment, the case where the above described respective control signals are positive logic, "H" level is active, and "L" level is inactive has been described, however, needless to add, the control signals may be negative logic, "L" level may be active, and "H" level may be inactive.

Next, an operation of the illuminating device 10 according to the embodiment will be described.

Figure 4:
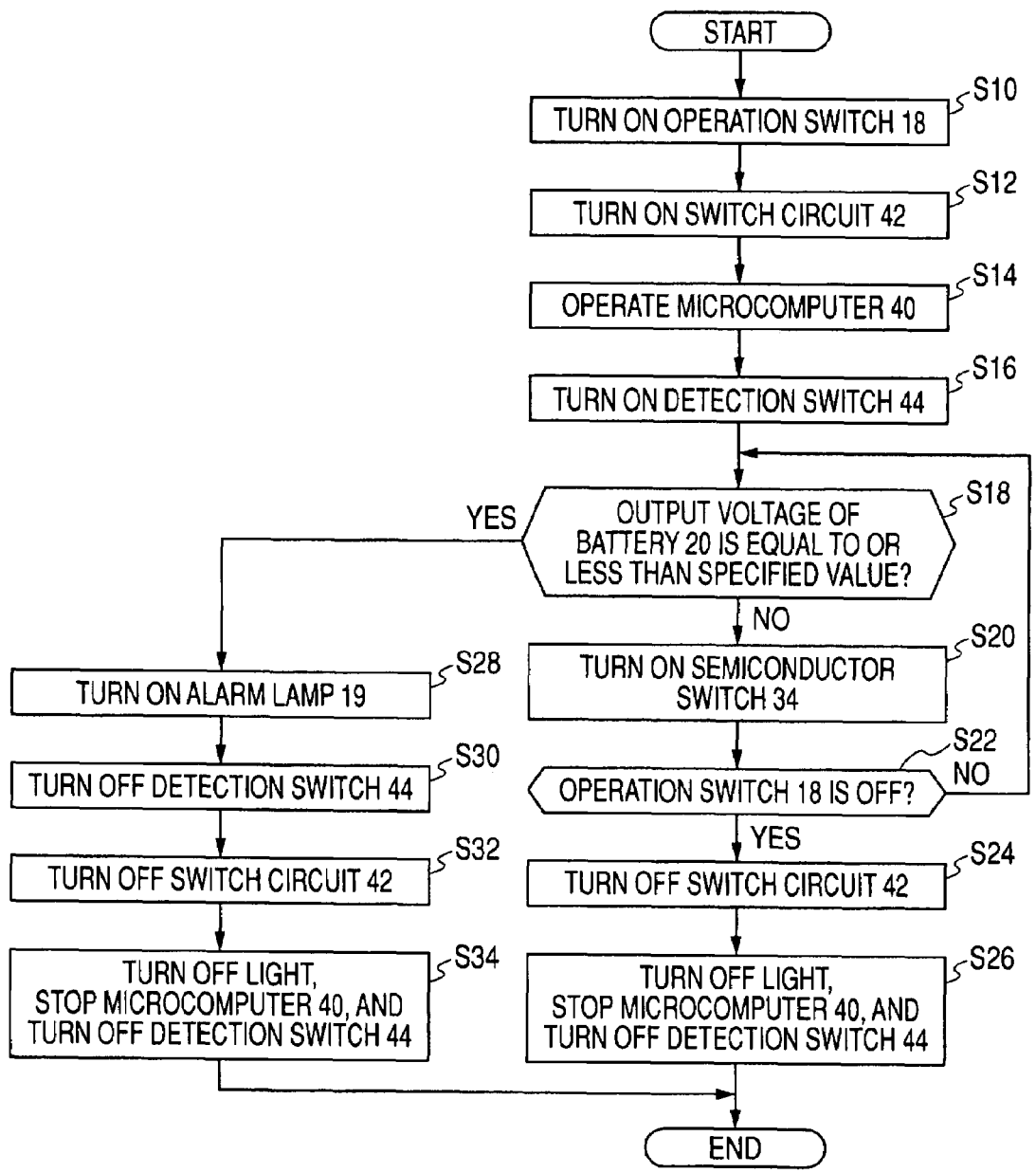
FIG. 4 is a flowchart for explanation of the operation of the illuminating device 10.

FIG. 4 is a flowchart for explanation of the operation of the illuminating device 10.

The case where the light source 16 of the illuminating device 10 is turned on will be described.

First, when the operation switch 18 is turned on (step S10), the switch circuit 42 is turned on (step S12), the power supply Vcc from the four batteries 20 is supplied to the regulator 32 via the switch circuit 42, and thereby, the power supply VDD is supplied from the regulator 32 to the microcomputer 40 and the microcomputer 40 starts operation (step S14).

The microcomputer 40 supplies the control signal S1 at "H" level to the first to fourth detection switches 44A to 44D to turn on all of the switches (step S16).

Thereby, the detection voltages V1 to V4 generated in the first to fourth detection voltage generating units 38A to 38D are input to the input ports 4010, 4012, 4014, and 4016 of the microcomputer 40, and whether the output voltages of the respective batteries 20 are equal to or less than a specified value or not is determined by the microcomputer 40 (step S18).

When all of the output voltages are not equal to or less than the specified value, in other words, when all of the output voltages are above the specified value, the output voltages of the respective batteries 20 are normal, and the microcomputer 40 supplies the control signal at "H" level to the semiconductor switch 34 to turn on the switch and supplies the power supply Vcc to the light source 16 to turn on the light source (step S20).

Unless the operation switch 18 is turned off, returning to step S18, the same operation is repeated (step S22).

When the operation switch 18 is turned off, the switch circuit 42 is turned off (step S24), the supply of the power supply Vcc to the light source 16 and the regulator 32 is stopped via the switch circuit 42. Thereby, the light source 16 is turned off, the supply of the power supply VDD to the microcomputer 40 is stopped, and thus, the operation of the microcomputer 40 is stopped.

Furthermore, when the operation of the microcomputer 40 is stopped, the output port 4020 of the microcomputer 40 is automatically at "L" level. Accordingly, the level of the control signal S1 supplied to the respective detection switches 44 becomes "L" level, and thus, all of the detection switches 44 are turned off (step S26).

Therefore, even if the input ports 4010, 4012, 4014, and 4016 of the microcomputer 40, to which the respective detection signals are input, are at "L" level, the output voltages of the respective batteries 20 are shut by the detection switches 44, and dark current flowing from the respective batteries 20 via the first to fourth detection voltage generating units 38A to 38D to the input ports 4010, 4012, 4014, and 4016 is rarely generated.

On the other hand, if determined that the output voltage of at least one of the four batteries 20 is equal to or less than the specified value at step S18, the microcomputer 40 turns on the alarm lamp 19 for predetermined time and informs the user that the illuminating device 10 is not available due to reduction in output voltage of the battery 20 (step S28).

After the predetermined time has elapsed, the microcomputer 40 supplies the control signal S1 at "L" level to the first to fourth detection switches 44A to 44D and turns off all of the detection switches (step S30).

Then, the microcomputer 40 supplies the control signal at "L" level from the output port 4002 to the control signal input terminal 4206 of the switch circuit 42 and turns off the switch circuit 42 (step S32).

Thereby, in the similar manner to that at step S26, the light source 16 is turned off, the operation of the microcomputer 40 is stopped, and all of the detection switches 44 are turned off (step S34).

Therefore, dark current flowing from the respective batteries 20 via the first to fourth detection voltage generating units 38A to 38D to the input ports 4010, 4012, 4014, and 4016 is rarely generated.

Note that, in the case where batteries other than the nickel-hydride batteries, for example, alkaline batteries and manganese batteries with lower capacity than that of the nickel-hydride batteries are mixed and used as the four batteries 20, the output voltages of the different batteries will be much lower than the output voltages of the other nickel-hydride batteries. In the embodiment, since the output voltages are monitored with respect to each battery 20, even in the case, the abnormality is detected at step S18 and the power supply to the light source 16 can be reliably stopped. Thus, the deterioration of the batteries 20 is prevented.

According to the embodiment, since the detection switches 44 that turn on/off the supply of the detection voltages V1 to V4 from the first to fourth detection voltage generating units 38A to 38D to the voltage monitoring unit are provided correspondingly to the first to fourth batteries 20A to 20D, respectively, the generation of dark current flowing from the first to fourth batteries 20A to 20D to the first to fourth voltage detecting units 38A to 38D can be reliably prevented by turning off all of the first to fourth detection switches 44A to 44D, and that is advantageous for the reduction in power consumption and the prevention of battery deterioration.

Further, in the embodiment, the detection switches 44 have been provided between the first resistances and the second resistances of the first to fourth detection voltage generating units 38A to 38D, however, the location of the detection switches 44 is not limited as long as the dark current from the battery 20 is able to be shut in the location. For example, the detection switches 44 may be provided between the terminals of the batteries 20 and the first resistances.

Although the illuminating device for imaging apparatus has been described in the embodiment, needless to add, the invention may be applied to portable electronic equipment including plural detection voltage generating units that are provided with respect to each battery and generate detection voltages from output voltages of the batteries, a voltage monitoring unit that is supplied with the plural detection voltages, respectively, and determines whether the respective output voltages of the batteries are equal to or less than a predetermined specified value or not with respect to each battery, and a control unit that turns on/off the power supply to the light source based on the determination result of the voltage monitoring unit. The invention may be applied to a video camera and digital still camera, or personal digital assistant (PDA), cellular phone, or the like.

It should be understood by those skilled in the art that various modifications, combinations, sub-combinations and alterations may occur depending on design requirements and other factors insofar as they are within the scope of the appended claims or the equivalents thereof.

What is claimed is:

1. An illuminating device for imaging apparatus comprising:
    a light source;
    plural batteries that supply power to the light source;
    plural detection voltage generating units that are provided with respect to each battery and generate detection voltages from output voltages of the batteries;
    a voltage monitoring unit that is supplied with the plural detection voltages, respectively, and determines whether the output voltages of the batteries are equal to or less than a predetermined specified value or not with respect to each battery; and
    a control unit that turns on/off the supply of the power to the light source based on a determination result of the voltage monitoring unit,
    wherein detection switches that turn on/off the supply of the detection voltages from the respective detection voltage generating units to the voltage monitoring unit based on the control by the control unit are provided with respect to each battery.

2. The illuminating device for imaging apparatus according to claim 1,
    wherein the voltage monitoring unit operates when the power is supplied from the plural batteries,
    the voltage monitoring unit has input ports to which the respective detection voltages are supplied, and
    current is allowed to flow through the input ports in the case where the detection voltages are supplied to the input ports when the operation of the voltage monitoring unit is stopped.

3. The illuminating device for imaging apparatus according to claim 1,
    wherein the control unit operates when the power is supplied from the plural batteries,
    a control signal becomes inactive when the operation of the control unit is stopped, and
    the detection switches include semiconductor switches, are turned on/off by the control signal supplied from the control unit and turned off when the control signal is inactive.

4. The illuminating device for imaging apparatus according to claim 1,
    wherein the detection switches include semiconductor switches that are turned on/off by the control signal supplied from the control unit.

5. The illuminating device for imaging apparatus according to claim 1, further comprising a semiconductor switch that turns on/off the supply of the power to the light source,
    wherein the semiconductor switch is turned on/off by the control signal supplied from the control unit, and
    the on/off of the supply of the power to the light source by the control unit is performed by turning on/off the semiconductor switch.

6. The illuminating device for imaging apparatus according to claim 1,
wherein the control unit and the voltage monitoring unit are configured by a microcomputer.

7. The illuminating device for imaging apparatus according to claim 1,
wherein the detection voltage generating unit generates the detection voltage by dividing the output voltage of the battery with resistances.

8. The illuminating device for imaging apparatus according to claim 1,
wherein the detection voltage generating unit generates the detection voltage by dividing the output voltage of the battery with a first resistance and a second resistance, and
the detection switch is provided between the first resistance and the second resistance.

9. The illuminating device for imaging apparatus according to claim 1,
wherein the detection voltage generating unit generates the detection voltage by dividing the output voltage of the battery with a first resistance and a second resistance, and
one end of the first resistance is connected to an output terminal of the battery, the other end of the first resistance is connected to one end of the detection switch, the other end of the detection switch is connected to one end of the second resistance, and the other end of the second resistance is connected to the ground.

10. The illuminating device for imaging apparatus according to claim 1, wherein the batteries are nickel-hydride batteries.

11. The illuminating device for imaging apparatus according to claim 1, further comprising an operation switch that turns on/off the supply of the power from the plural batteries to the voltage monitoring unit and the control unit.

12. The illuminating device for imaging apparatus according to claim 1, further comprising a case that accommodates the batteries, a power supply switch unit, the detection voltage generating units, the voltage monitoring unit, and the control unit,
wherein the case has a mounting part detachably mounted to an accessory mount part provided in the imaging apparatus.

* * * * *